(No Model.)
R. REACH.
JOINT WIPER.
No. 267,800. Patented Nov. 21, 1882.
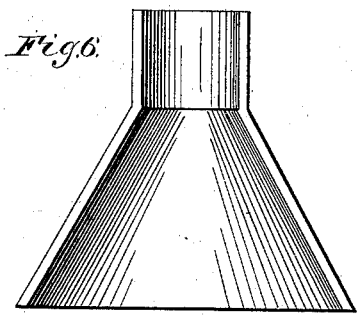
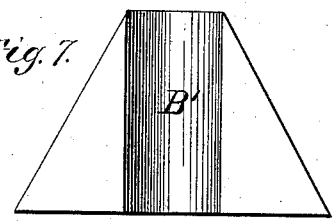
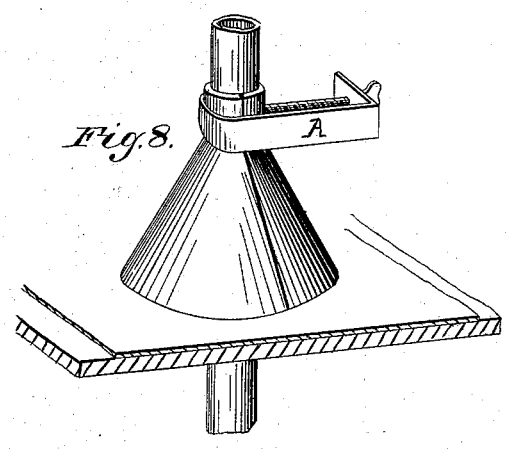
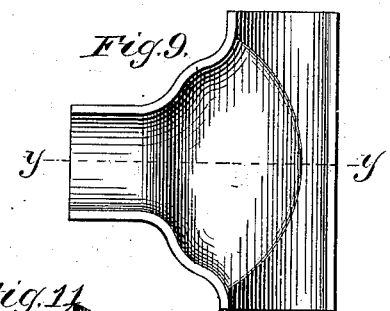
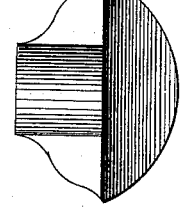
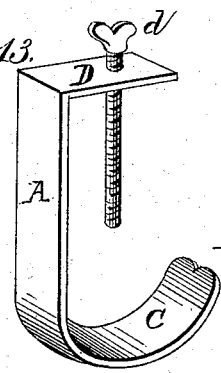
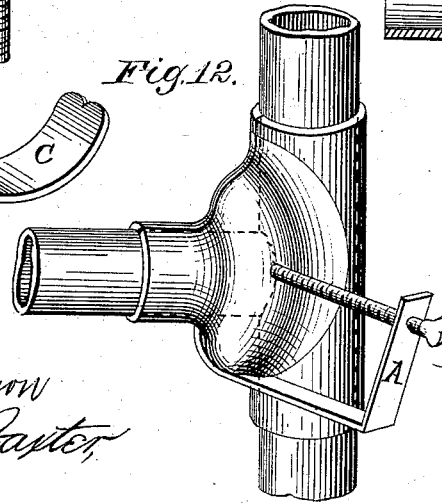
Witnesses.
N. C. Brown
Jas. A. Baxter
Inventor
Robert Reach
By Myers &co
Atty.

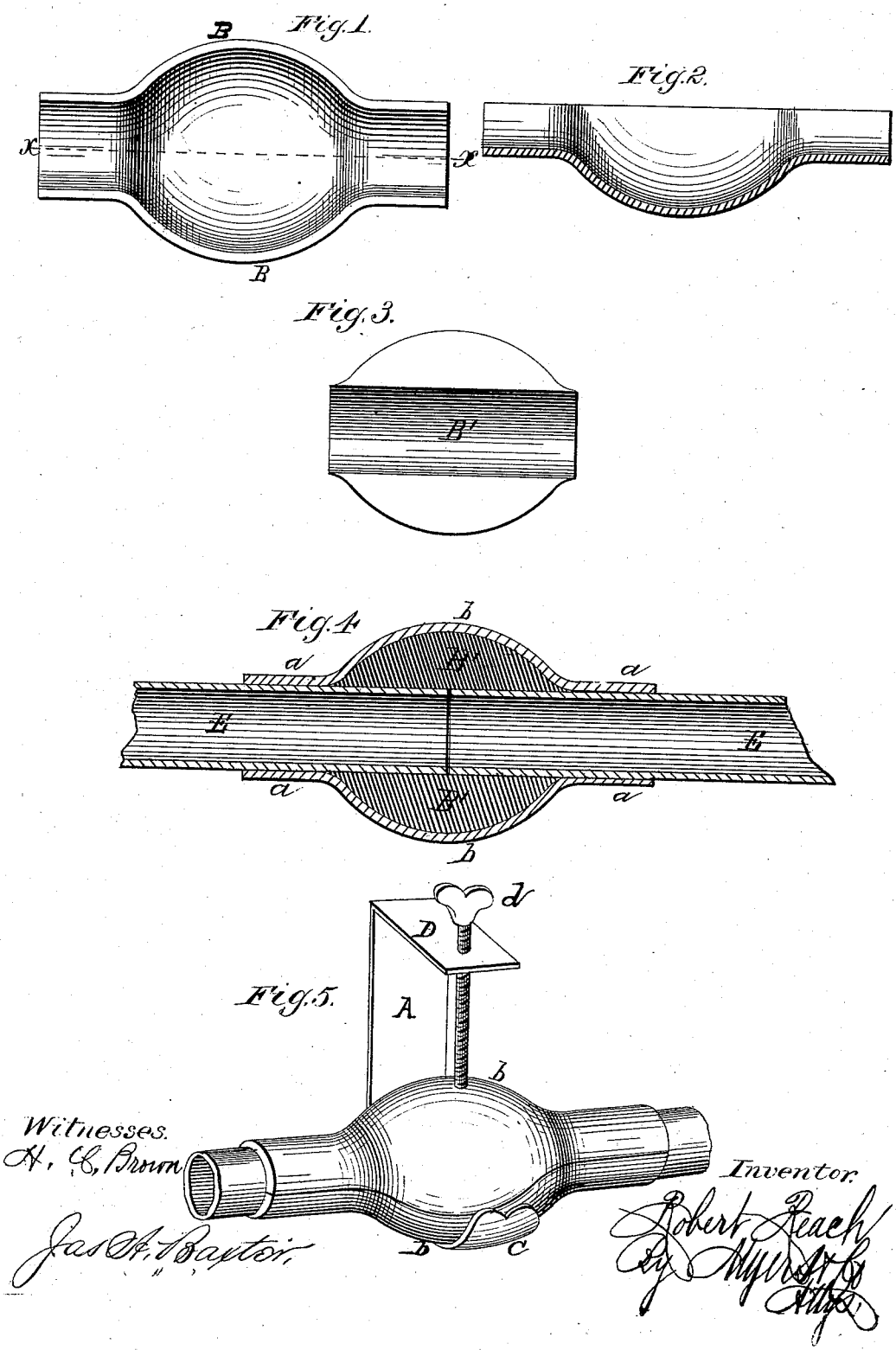

UNITED STATES PATENT OFFICE.

ROBERT REACH, OF WASHINGTON, DISTRICT OF COLUMBIA.

JOINT-WIPER.

SPECIFICATION forming part of Letters Patent No. 267,800, dated November 21, 1882.

Application filed March 30, 1882. (No model.)

*To all whom it may concern:*

Be it known that I, ROBERT REACH, a citizen of the United States, residing at Washington, District of Columbia, have invented certain new and useful Improvements in Joint-Wipers, of which the following is a specification, reference being had therein to the accompanying drawings.

My invention relates to a joint-wiper as an improved tool for plumber's use; and it consists in the solder-forms B', the clamp A, for clamping the sections together, the sections B and B, and in the construction, combination, and arrangement of the parts, as hereinafter more specifically described.

In the drawings, Figure 1 is a plan view of one half of mold for straight joint. Fig. 2 is a section on line x x. Fig. 3 is a view of solder to be placed in mold. Fig. 4 is a section of the pipe, showing solder and mold in position. Fig. 5 is a perspective view, showing application of clamp. Fig. 6 is a plan view of one half of mold for floor-joint. Fig. 7 is a plan view of solder to be used therein. Fig. 8 shows application of floor-joint wiper. Fig. 9 is a plan view of one half of mold of angle-joint. Fig. 10 is a section on line y y. Fig. 11 is a view of solder to be used therein. Fig. 12 shows application of angle-joint wiper. Fig. 13 is a perspective view of clamp.

B B represent sections of my joint-wiper, which are cylindrical and conformed at a and a to the contour of the periphery of a pipe, and curved and enlarged in the middle at b and b for reception of the solder-forms B'. The sections may be cast of any hard metal.

B' B' represent solder-forms, which are inserted in the concave section-molds B and B, and when therein inserted fit flush against the periphery of the ends of the pipes, as shown in Fig. 4. These solder-forms are thus cast, and of suitable metal or amalgam, their contour being designed with exact relation to their intended purpose.

The clamp A is designed to clamp securely together the sections of the joint-wiper. It is provided with the concave bearing C, which is curved to conform to the contour of the sections B and B, and it is also provided with the right-angular arm D, which has therein a female screw for reception of the thumb-screw, d, the arm and bearing being cast solid with the vertical standard A.

The pipes E and E, preparatory to forming thereon the joint, are slightly shaved, in order to cause them to receive and hold the solder placed thereon. The forms B' are then inserted in the concave sections B and B, which are then firmly bound together upon the pipes E and E by means of clamp A, as shown in Fig. 5. A proper flame or heat is then applied to the sections until the solder is thus melted, and the clamp and sections are then slightly rotated, which causes the solder to be spread uniformly over the pipe and to take hold thereon, and the solder is then permitted to cool. The clamp and sections are then removed, and the solder is found to be hardened and rigidly secured to the ends of the pipes and conformed to the shape of the interior of the sections.

In forming a floor-joint for pipes as a means of retaining the ends of the pipes flush with the plane of the floor or drain to which the pipes may be secured, I adopt the method shown in Fig. 8, the sections being formed in semi-conical shape, as shown in Fig. 6, and the solder-forms being each a semi-cone, as represented by Fig. 7, and in such cases the clamps are affixed thereto horizontally, as shown.

In joint-wiping a horizontal and vertical pipe at their intersection, the sections are formed as shown in Figs. 9 and 10, the solder-forms as shown in Fig. 11, and the clamp is applied as shown in Fig. 12; but in wiping this class of joints the process cannot be hastened by rotating the clamp, as the contour of the joint prevents its rotation.

Having thus described my invention, what I claim, and desire to secure by Letters Patent, is—

The combination of the sections B and B, for reception of solder-forms B', and clamp A, substantially as shown, and for the purpose described.

In testimony whereof I affix my signature in presence of two witnesses.

ROBERT REACH.

Witnesses:
GEO. R. HERRICK,
JAS. A. BARTER.